(12) United States Patent
Barbalet et al.

(10) Patent No.: US 9,592,449 B2
(45) Date of Patent: Mar. 14, 2017

(54) GAMING SYSTEM AND METHOD OF GAMING FOR CONTROLLING THE DISPLAY OF APPEARANCE CHARACTERISTICS OF AN AVATAR

(71) Applicant: Aristocrat Technologies Australia Pty Limited, North Ryde (AU)

(72) Inventors: Thomas Samuel Barbalet, Las Vegas, NV (US); Peter Jude Mastera, Henderson, NV (US); Lattamore Osburn, Las Vegas, NV (US); Mark Hripko, Henderson, NV (US); Steven Rood, Henderson, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

(21) Appl. No.: 13/934,462

(22) Filed: Jul. 3, 2013

(65) Prior Publication Data

US 2014/0011576 A1    Jan. 9, 2014

Related U.S. Application Data

(60) Provisional application No. 61/668,252, filed on Jul. 5, 2012.

(51) Int. Cl.
| | | |
|---|---|---|
| *G07F 17/32* | (2006.01) | |
| *A63F 13/58* | (2014.01) | |
| *A63F 13/00* | (2014.01) | |
| *A63F 13/71* | (2014.01) | |
| *A63F 13/60* | (2014.01) | |

(Continued)

(52) U.S. Cl.
CPC ............. *A63F 13/58* (2014.09); *A63F 13/00* (2013.01); *A63F 13/55* (2014.09); *A63F 13/60* (2014.09); *A63F 13/71* (2014.09); *G07F 17/32* (2013.01); *G07F 17/326* (2013.01); *A63F 13/5378* (2014.09); *A63F 2300/5553* (2013.01)

(58) Field of Classification Search
CPC .......... A63F 13/55; A63F 13/58; A63F 13/60; A63F 13/63; A63F 13/65; A63F 13/69; A63F 2300/5553; G07F 17/326
USPC ..................................................... 463/25, 31
See application file for complete search history.

(56) References Cited

U.S. PATENT DOCUMENTS

| | | | | |
|---|---|---|---|---|
| 5,720,663 | A * | 2/1998 | Nakatani ............... | A63F 13/005 463/23 |
| 7,775,885 | B2 * | 8/2010 | Van Luchene .......... | A63F 13/10 463/42 |
| 8,657,675 | B1 * | 2/2014 | Meyerhofer et al. ........... | 463/25 |

(Continued)

OTHER PUBLICATIONS

Star Wars: Knights of the Old Republic [online], released Nov. 2003, [retrieved on Aug. 6, 2008]. Retrieved from the Internet: < URL:http://replacementdocs.com>.*

*Primary Examiner* — Dmitry Suhol
*Assistant Examiner* — David Duffy
(74) *Attorney, Agent, or Firm* — McAndrews, Held & Malloy, Ltd.

(57) ABSTRACT

Disclosed is a gaming system comprising a display and a game controller, the game controller being arranged to identify a player from received player identification data, receive associated player game data of the identified player, and control the display of one or more characteristics of, or associated with, an avatar such that the player is provided with a graphical representation of the player game data. A method of gaming is also disclosed.

18 Claims, 6 Drawing Sheets

(51) Int. Cl.
*A63F 13/55* (2014.01)
*A63F 13/5378* (2014.01)

(56) References Cited

U.S. PATENT DOCUMENTS

| | | | |
|---|---|---|---|
| 2005/0137015 A1* | 6/2005 | Rogers et al. | 463/42 |
| 2005/0192097 A1* | 9/2005 | Farnham et al. | 463/42 |
| 2005/0209002 A1* | 9/2005 | Blythe et al. | 463/42 |
| 2006/0121973 A1* | 6/2006 | Parisien | 463/16 |
| 2006/0154715 A1* | 7/2006 | Black et al. | 463/13 |
| 2007/0155500 A1* | 7/2007 | Honour | 463/37 |
| 2007/0218987 A1* | 9/2007 | Van Luchene | A63F 13/10 463/30 |
| 2007/0218997 A1* | 9/2007 | Cho | 463/42 |
| 2007/0283265 A1* | 12/2007 | Portano | 715/706 |
| 2008/0026839 A1* | 1/2008 | Alringer | 463/31 |

\* cited by examiner

GAMING SYSTEM AND METHOD OF GAMING FOR CONTROLLING THE DISPLAY OF APPEARANCE CHARACTERISTICS OF AN AVATAR

RELATED APPLICATIONS

This application claims priority to U.S. Provisional Patent Application No. 61/668,252 having a filing date of Jul. 5, 2012, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Current gaming machines may represent a player's remaining credit and credit won during a game with a credit meter and a win meter respectively. While such gaming systems provide players with enjoyment, a need exists for alternative gaming systems in order to maintain or increase player enjoyment.

BRIEF SUMMARY OF THE INVENTION

In a first aspect, the invention provides a gaming system comprising:
  a display; and
  a game controller arranged to:
  (a) identify a player from received player identification data;
  (b) receive associated player game data of the identified player; and
  (c) control the display of one or more characteristics of, or associated with, an avatar such that the player is provided with a graphical representation of the player game data.

In an embodiment, the game controller is arranged to change the display of one or more characteristics of, or associated with, the avatar in response to a change in the player game data.

In an embodiment, the avatar is a personalised avatar based on the player's avatar appearance choices.

In an embodiment, the player game data represents one or more of the player's credit remaining in the game, the player's credit input to the game, the player's time spent playing the game, or the player's credit won from the game.

In an embodiment, the player is also provided with a graphical representation of a credit meter and a win meter.

In an embodiment, the game controller receives the player identification data from a player marketing module arranged to read player identification data from a tracking device.

In an embodiment, the game controller receives the player game data from the player marketing module which is also arranged to read player game data from the tracking device.

In an embodiment, the game controller receives the player game data from a server associated with the gaming system.

In an embodiment, the graphical representation comprises an indication of one or more of mana, health, or experience.

In an embodiment, mana represents one of the player's credit remaining in the game, the player's credit input to the game, the player's time spent playing the game, or the player's credit won from the game.

In an embodiment, health represents one of the player's credit remaining in the game, the player's credit input to the game, the player's time spent playing the game, or the player's credit won from the game.

In an embodiment, experience represents one of the player's credit remaining in the game, the player's credit input to the game, the player's time spent playing the game, or the player's credit won from the game.

In a second aspect, the invention provides a method of gaming in a gaming system comprising:
  (a) identifying a player from received player identification data;
  (b) receiving associated player game data of the identified player; and
  (c) controlling a display of the gaming system to display one or more characteristics of, or associated with, an avatar such that the player is provided with a graphical representation of the player game data.

In an embodiment, the game controller is arranged to change the display of one or more characteristics of, or associated with, the avatar in response to a change in the player game data.

In an embodiment, the avatar is a personalised avatar based on the player's avatar appearance choices.

In an embodiment, the player game data represents one or more of the player's credit remaining in the game, the player's credit input to the game, the player's time spent playing the game, or the player's credit won from the game.

In an embodiment, the player is also provided with a graphical representation of a credit meter and a win meter.

In an embodiment, the game controller receives the player identification data from a player marketing module arranged to read player identification data from a tracking device.

In an embodiment, the game controller receives the player game data from the player marketing module which is also arranged to read player game data from the tracking device.

In an embodiment, the game controller receives the player game data from a server associated with the gaming system.

In an embodiment, the graphical representation comprises an indication of one or more of mana, health, or experience.

In an embodiment, mana represents one of the player's credit remaining in the game, the player's credit input to the game, the player's time spent playing the game, or the player's credit won from the game.

In an embodiment, health represents one of the player's credit remaining in the game, the player's credit input to the game, the player's time spent playing the game, or the player's credit won from the game.

In an embodiment, experience represents one of the player's credit remaining in the game, the player's credit input to the game, the player's time spent playing the game, or the player's credit won from the game.

In a third aspect, the invention provides computer program code which when executed implements the above method.

In a fourth aspect, the invention provides computer readable medium comprising the computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
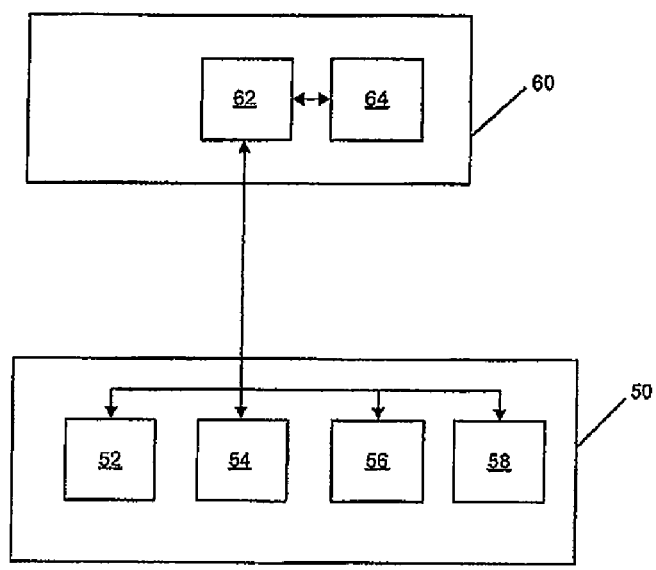
FIG. 1 is a block diagram of the core components of a gaming system.

Referring to the drawings, there is shown a gaming system having a game controller arranged to implement a game where the display provides a player with a graphical representation of their player game data. This is achieved by controlling the display of one or more characteristics of, or associated with, an avatar. Certain characteristics, representing corresponding player game data sets, of the player's avatar are changed during the course of play.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
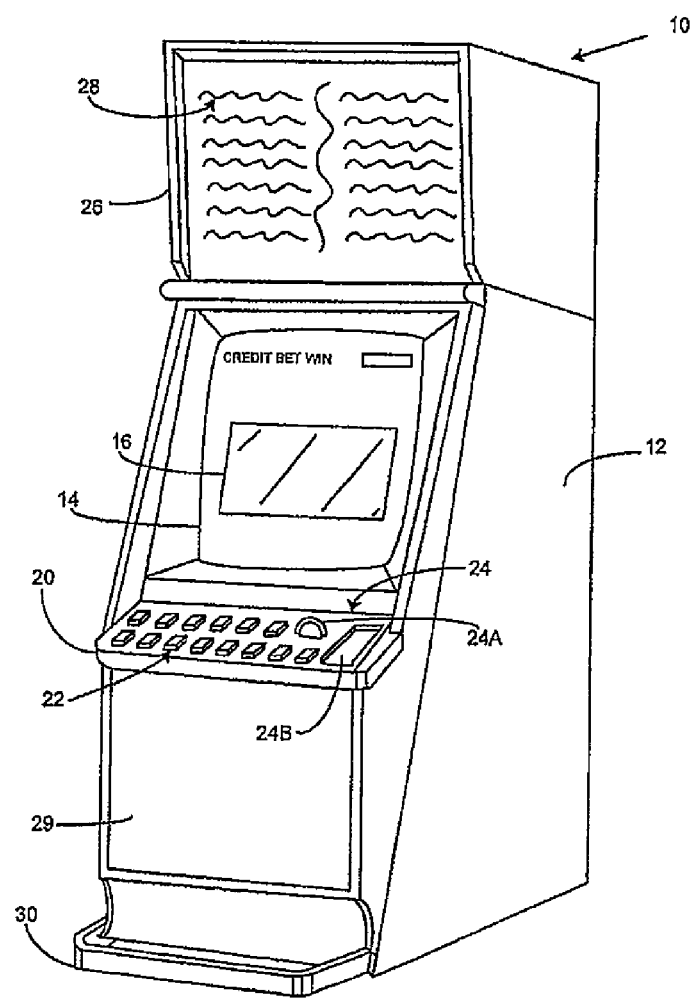
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticket. A player marketing module (shown in FIG. 6) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
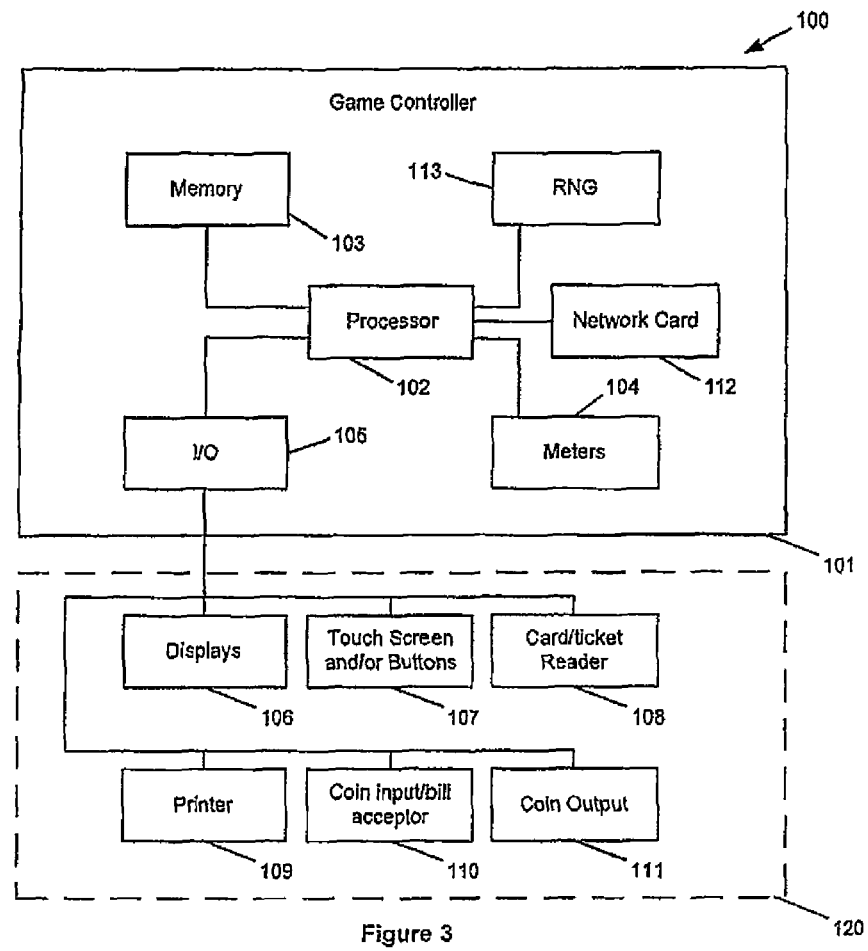
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
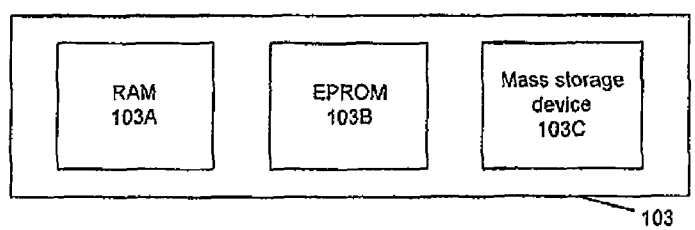
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
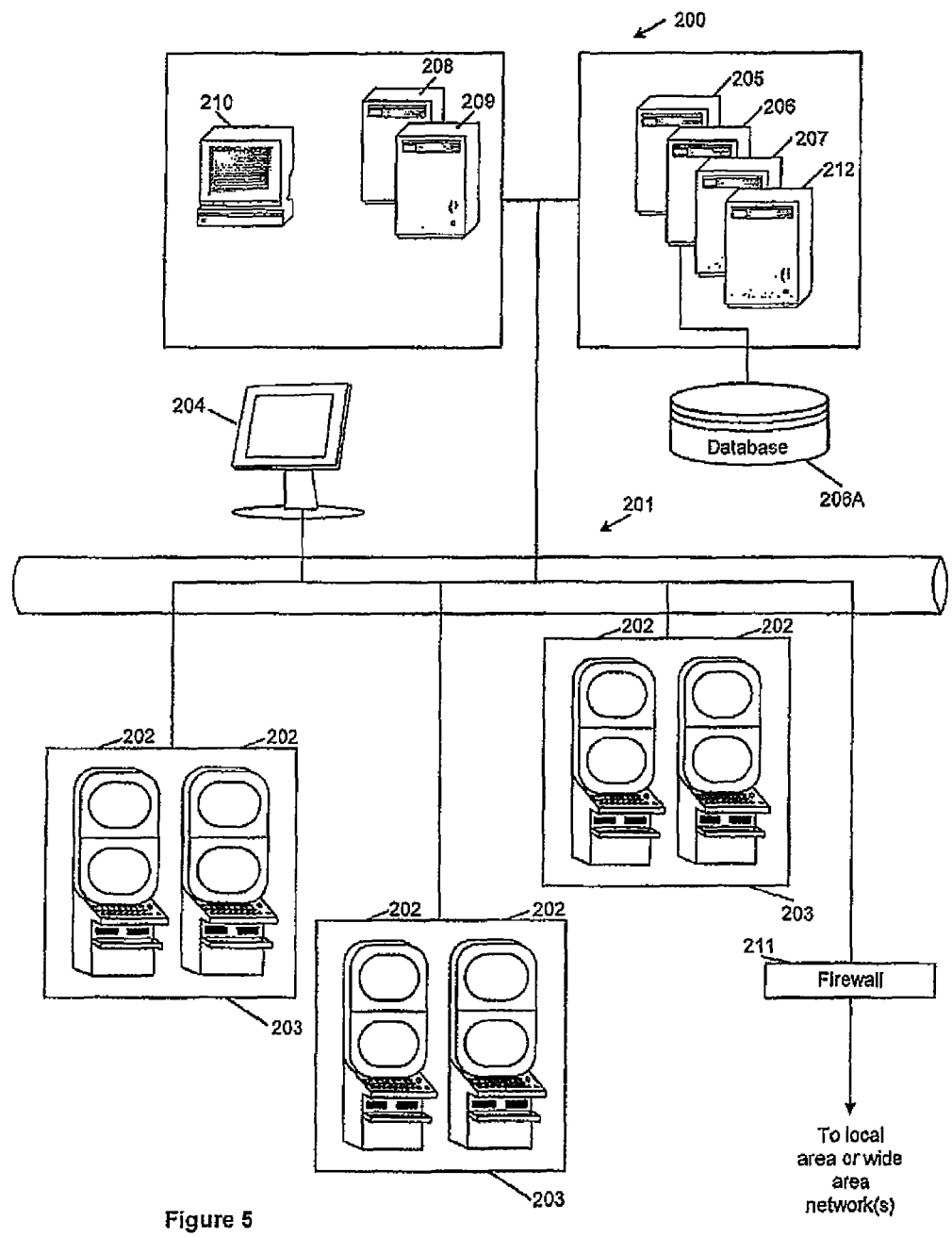
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

In other embodiments a player win entitlement may be affected by purchasing access to particular pay tables—e.g. a first bet amount entitles the player to wins including cherries and a second amount entitles them to wins including plums.

A game round involves at least one of the reels being "spun"—e.g. new symbols of the reels are selected for display at the display positions and the reel is either physically or virtually spun to a stop. Persons skilled in the art will appreciate that there may be more than one game round in a play of a gaming machine such as is the case when a series of free spins is awarded. The outcome of a game round may be no win, a win (for example from a winning combination of symbols), a contribution towards a win accrued over a plurality of game rounds, etc. Typically, a win will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Figure 6:
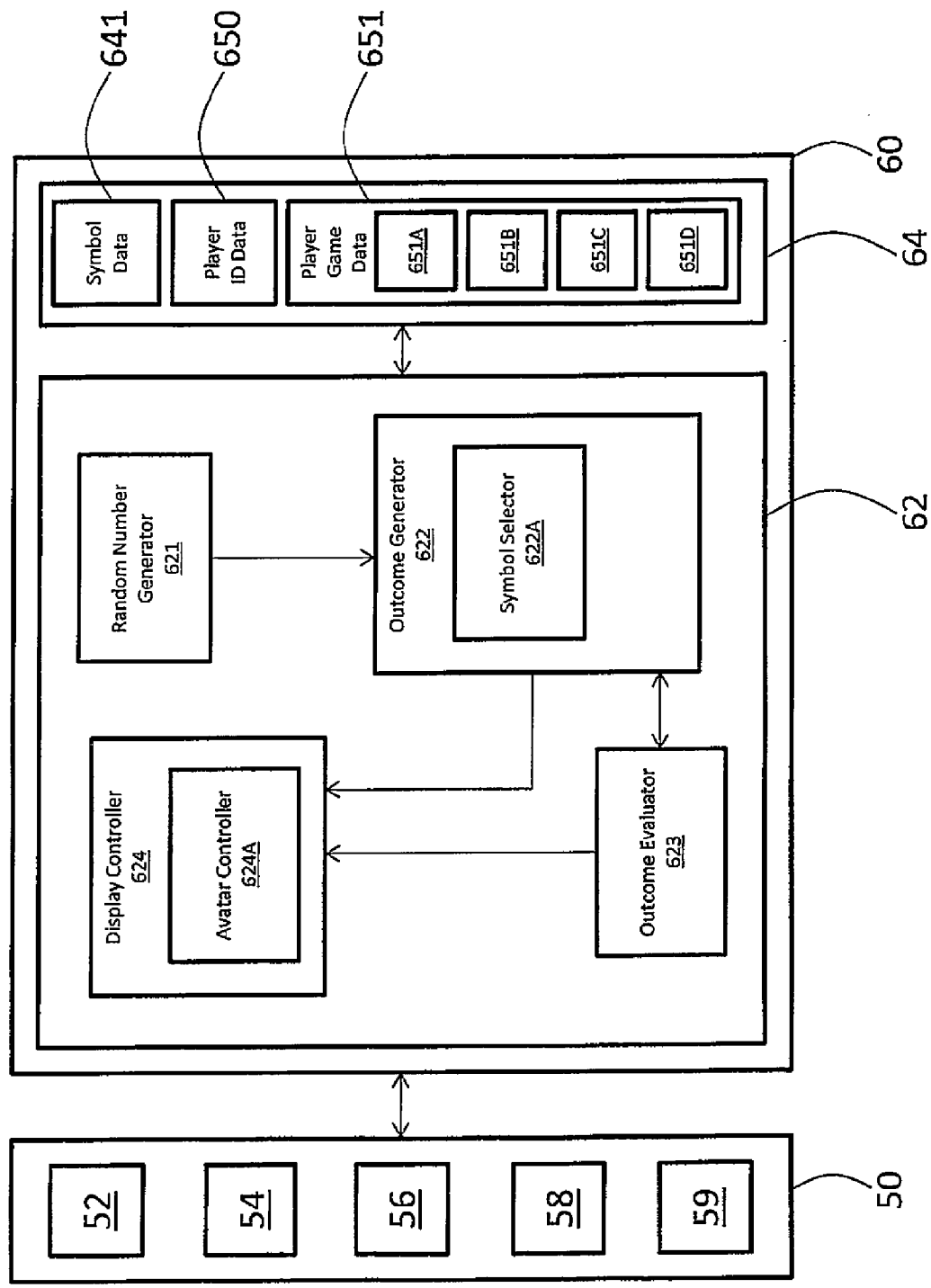
FIG. 6 is a further block diagram of a gaming system.

In FIG. 6, the processor 62 of game controller 60 is shown implementing a number of modules based on program code and data stored in memory 64. Persons skilled in the art will appreciate that various of the modules could be implemented in some other way, for example by a dedicated circuit.

In an embodiment of the invention, the player interface includes a credit mechanism 52, one or more displays 54, a game play mechanism 56, one or more speakers 58, and a player marketing module 59. A player may operate the player marketing module 59 through interaction with a player tracking device, for example by inserting a player tracking card into a card reader. The game controller 60 is arranged to identify the player from received player identification data 650 transferable from the player tracking device. Alternatively, the player marketing module 59 may communicate with a database server across a network in order to identify the player (for example, the database of a player loyalty system). The player identification data 650 may be held in memory 64 for the duration of the player's gaming session, or alternatively may be used once to identify the player and then discarded from memory.

The game controller 60 is also arranged to receive player game data 651 that is associated with the player and the player identification data 650. The player game data 651 may be stored on the player tracking device, or on a server accessible by the player marketing module 59. The player game data 651 may be held in memory 64 for the duration of the player's gaming session. The player game data 651 may also be updated by the game controller 60 or in any other suitable manner, such as by a server. In embodiments where the player game data 651 is received from the player tracking device, the marketing module 59 may update the game data 651 on the tracking device, for example by prompting the player to operate the marketing module 59 at the end of a gaming session.

The player game data 651 comprises one or more data sets such as: credit remaining 651A in the game; credit input 651B to the game; time 651C spent playing the game; and credit won 651D from the game. Credit remaining 651A may represent the total credit the player has left to play with and may reflect a credit meter. Credit input 651B may represent the total credit the player has input to the game since beginning playing it either in the current gaming session or across a plurality of gaming sessions. Time 651C may represent the total time the player has spent playing the game since beginning playing it either in the current gaming session or across a plurality of gaming sessions. Credit won 651D may represent the total credit won, ignoring any losses, and may ratchet up in proportion to a win meter (the win meter typically being reset to zero at the beginning of each new game or when cashing out). Credit input 651B, time 651C and credit won 651D may each be represented by a variable in memory 64 that is programmed to only increase. Credit remaining 651A may be represented by a variable in memory 64 that can increase or decrease and where a value of zero indicates that the player must insert more credit in order to keep playing.

The processor 62 typically comprises further modules required to work the gaming machine as will be appreciated by persons skilled in the art. Broadly, such modules include the outcome generator 622 which operates in response to the player's operation of game play mechanism 56 to place a wager and initiate a play of the game and generates a game outcome which will then be evaluated by award evaluator 623. The first part of forming the game outcome is for a symbol selector 622A to select symbols from a set of symbols specified by symbol data 641 using random number generator 621. The selected symbols are advised to the display controller 624 which causes them to be displayed on display 54 at a set of display positions.

One example of selecting symbols is for the symbol selector 622A to select symbols for display from a plurality of symbol sets corresponding to respective ones of a plurality of spinning reels. The symbol sets 641 can specify a sequence of symbols for each reel such that the symbol selector 622A can select all of the symbols by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

During game play, an avatar with one or more associated characteristics is continuously or intermittently displayed on display 54. The game controller 60 is arranged to control the display 54 to change the characteristics of the avatar such that the player is provided with a graphical representation of the player game data 651. An avatar controller module 624A or any other suitable module may execute the rendering or image processing required for display of the avatar. The avatar may be a character such as a stylised human or non-human, icon, symbol, graphic, picture or any other suitable graphical representation. For example, the avatar may be a cartoon samurai that is controlled to appear to run and jump around the display in a game with a martial arts theme. Alternatively, the avatar may simply be a static polygon. The changeable characteristics may be an integral part of the avatar's design or may be some indicators external to the avatar's design.

Furthering the samurai example, the samurai's clothing colour, clothing style, hair colour, hair style, sword length, sword design, equipment carried or any other suitable characteristic may change in response to changing player game data 651. As another example, the samurai's appearance may become bloodied and bruised as the credit remaining 651A becomes low and may become less bloodied and bruised to the point of no injuries as the player inserts more credit and increases the credit remaining 651A data. As another example, the samurai may carry progressively better equipment as credit won 651D increases. As another example, the avatar may grow older and appear wiser as time 651C increases. The game controller is typically arranged to change the display of one or more characteristics of, or associated with, the avatar in response to a change in the player game data.

As another example, the avatar may have associated external bars (similar to health bars or life bars in video games), the fullness of which increases or decreases in response to changing player game data 651. As another example, the concepts of mana (or magical energy), health (or physical energy) and experience may each be graphically represented by a characteristic of the avatar where mana, health and experience each represent one of credit remaining 651A, credit input 651B, time 651C, credit won 651D, or any other suitable data. Mana may be graphically represented by, for example, a mana bar, an aura field that grows and shrinks around the avatar, or in any other suitable manner. Health may be graphically represented by, for example, a health bar, physical injuries on the avatar, or in any other suitable manner. Experience may be graphically represented by, for example, an experience bar, age of the avatar, equipment or weapons held by the avatar, or in any other suitable manner.

In an advantageous embodiment, each player of the game may have an associated, personalised avatar. For example, the avatar of a first player of a martial arts themed game may represent a samurai with white clothes and black hair. The avatar of a second player of that game may represent a samurai with blue clothes and blonde hair. The avatar of a third player of that game may represent a ninja with black clothes and a red headband. Upon playing a game for the first time, the player may be prompted to choose a particular avatar (for example, samurai, ninja, or otherwise) and certain features (for example, clothing, hair, or otherwise). These avatar appearance choices may be saved as data on the player tracking device, in a player loyalty system provided on a server or in any other suitable manner. In this embodiment, the player's chosen, personalised avatar will be displayed each time they play the game, including changes in the avatar's appearance in response to changes in player game data 651. The player may be able to change their chosen avatar if so desired, for example, from samurai to ninja or clothing or hair colour. If a player changes their avatar, the new avatar may have corresponding characteristics, such as similar physical injuries or age, representing the current state of the player game data 651. The updated avatar appearance choices may be saved as data in a suitable manner. Alternatively, the player may use a default avatar which may be predetermined or randomly selected by the game controller 60.

In an embodiment, the win meter and credit meter may be both displayed independent to and at the same time as the avatar. Both the credit meter and the avatar may display the credit remaining 651A data.

Figure 7:
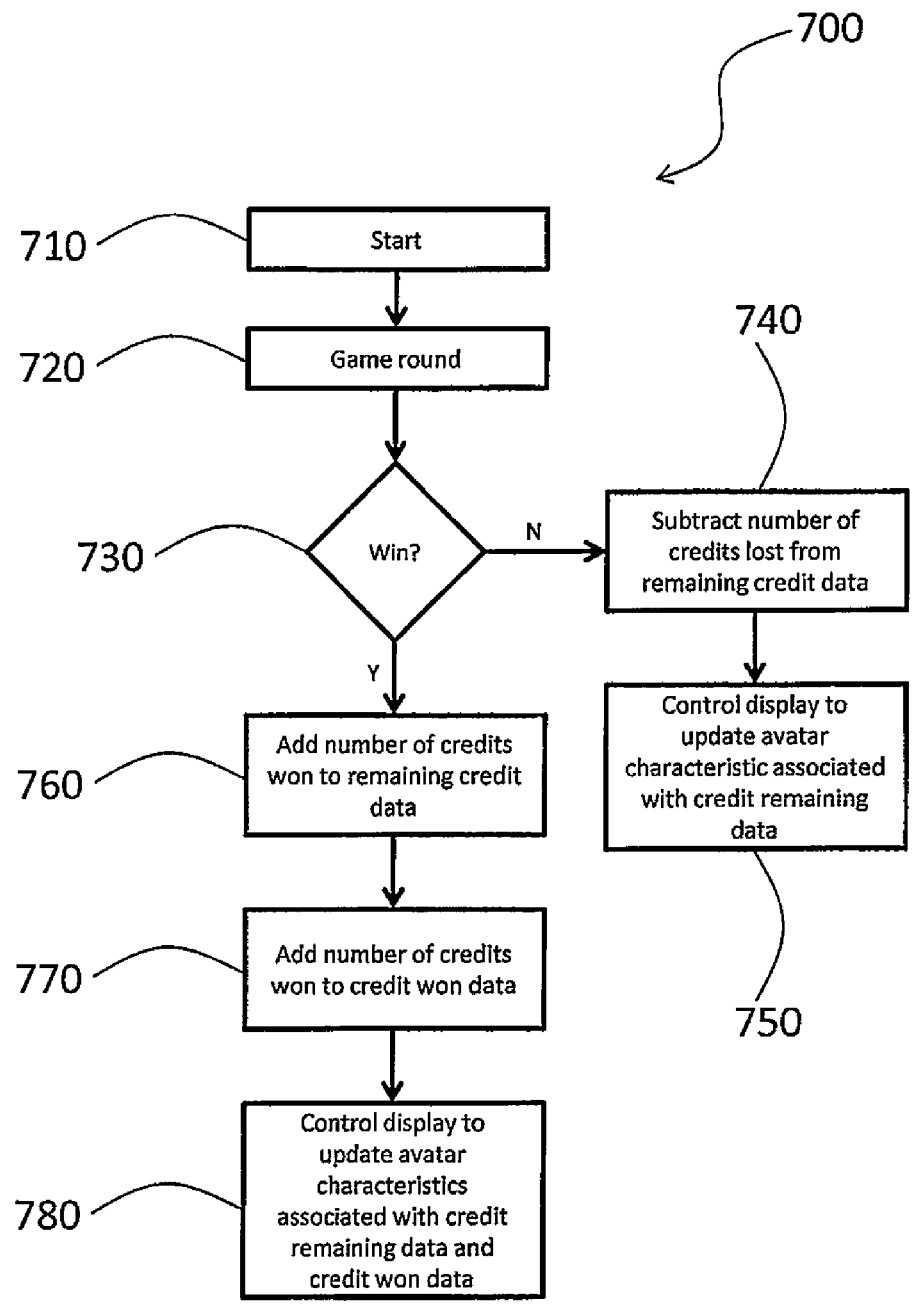
FIG. 7 is a flow chart of an embodiment.

The method 700 of an embodiment is summarized in FIG. 7, which assumes the player has been identified, player game data has been loaded, and the player has some amount of credit remaining. When the player starts 710, a round of the game 720 is played. Note that a round of the game 720 may comprise one or spins of the reels depending on the particular game being played. The game controller determines whether the player won 730 the game. If the player did not win, the number of credits lost in that game is subtracted 740 from the remaining credit data. Also, the display is controlled to update 750 the visual characteristic of the avatar associated with the remaining credit data.

If the player did win, the number of credits won in that game is added 760 to the remaining credit data. Also, the number of credits won is added 770 to the credit won data. Further, the display is controlled to update 780 the visual characteristics of the avatar associated with each of the remaining credit data and the credit won data. In embodiments where a round of the game 720 comprises more than one spin of the reels, the player game data and avatar displayed may be updated at the end of each spin, or at the end of the round of the game 720.

The method associated with the credit input data and time data may not be dependent on the outcome of the game. The credit input data is generally increased each time the player inputs credit into the gaming machine. The time data may be increased according to a clock module which may be provided in the game controller.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system for playing a game, the gaming system comprising:
   a display;
   a credit input mechanism configured to receive a physical item associated with a monetary value for establishing a credit balance, the credit balance being increasable and decreasable based at least on wagering activity; and
   a game controller responsive to the credit input mechanism having accepted a credit, and configured to:
   (a) identify a player from received player identification data;
   (b) receive associated player game data of the identified player based at least in part on the established credit balance, wherein the player game data is one or more of the player's credit remaining in the game, the player's credit input to the game, the player's time spent playing the game, and the player's credit won from the game; and
   (c) control the display of one or more appearance characteristics of an avatar such that the player is provided with a graphical representation of the player game data, wherein the avatar is a character, and wherein the one or more appearance characteristics is an integral part of the avatar; and
   wherein the game controller is further configured (a) to initially display, via the display, the avatar having a first appearance characteristic that is indicative of the player game data having a first state, (b) to change said first appearance characteristic to a second appearance characteristic in response to the player game data one or more of increasing or decreasing from said first state to a second state, and (c) to change said second appearance characteristic back to said first appearance characteristic if the player game data changes from said second state to said first state.

2. The gaming system as claimed in claim 1, and wherein the avatar is a personalised avatar based on the player's avatar appearance choices.

3. The gaming system as claimed in claim 1, and wherein the game controller is further configured to display a graphical representation of a credit meter and a win meter.

4. The gaming system as claimed in claim 1, and further comprising a tracking device, and wherein the game controller is further configured to receive the player identification data from a player marketing module configured to read player identification data from the tracking device.

5. The gaming system as claimed in claim 1, and wherein the game controller is further configured to receive the player game data from a server associated with the gaming system.

6. The gaming system as claimed in claim 1, and wherein the graphical representation comprises an indication of one or more of mana, health, and experience.

7. The gaming system as claimed in claim 6, and wherein the mana represents one of the player's credit remaining in the game, the player's credit input to the game, the player's time spent playing the game, and the player's credit won from the game.

8. The gaming system as claimed in claim 6, and wherein the health represents one of the player's credit remaining in the game, the player's credit input to the game, the player's time spent playing the game, and the player's credit won from the game.

9. The gaming system as claimed in claim 6, and wherein the experience represents one of the player's credit remaining in the game, the player's credit input to the game, the player's time spent playing the game, and the player's credit won from the game.

10. A method of playing a game in a gaming system having a credit input mechanism configured to receive a physical item associated with a monetary characteristic for establishing a credit balance, a game controller, and a display, the method comprising:
    determining via the credit input mechanism if a credit has been accepted;
    in response to a credit having been accepted, identifying via the game controller a player from received player identification data;
    receiving via the game controller associated player game data of the identified player based at least in part on the established credit balance, wherein the player game data is one or more of the player's credit remaining in the game, the player's credit input to the game, the player's time spent playing the game, and the player's credit won from the game;
    controlling the display to display one or more appearance characteristics of an avatar such that the player is provided with a graphical representation of the player game data, wherein the avatar is a character, and wherein the one or more appearance characteristics is an integral part of the avatar;
    initially displaying on the display the avatar having a first appearance characteristic that is indicative of the player game data having a first state;

changing the displaying of said first appearance characteristic to displaying a second appearance characteristic in response to the player game data one or more of increasing or decreasing from said first state to a second state; and changing the displaying of the avatar from said second appearance characteristic back to displaying said first appearance characteristic if the player game data changes from said second state to said first state.

11. The method of playing a game as claimed in claim 10, and further including personalizing the avatar based on the player's avatar appearance choices.

12. The method of playing a game as claimed in claim 10, further comprising displaying a graphical representation of a credit meter and a win meter.

13. The method of playing a game as claimed in claim 10, further comprising receiving the player identification data from a player marketing module arranged to read player identification data from a tracking device.

14. The method of playing a game as claimed in claim 10, further comprising receiving the player game data from a server associated with the gaming system.

15. The method of playing a game as claimed in claim 10, and wherein the graphical representation comprises an indication of one or more of mana, health, and experience.

16. The method of playing a game as claimed in claim 15, and wherein the mana represents one of the player's credit remaining in the game, the player's credit input to the game, the player's time spent playing the game, and the player's credit won from the game.

17. The method of playing a game as claimed in claim 15, and wherein the health represents one of the player's credit remaining in the game, the player's credit input to the game, the player's time spent playing the game, and the player's credit won from the game.

18. The method of playing a game as claimed in claim 15 where the experience represents one of the player's credit remaining in the game, the player's credit input to the game, the player's time spent playing the game, and the player's credit won from the game.

* * * * *